United States Patent
Hashida et al.

(10) Patent No.: US 6,300,385 B1
(45) Date of Patent: Oct. 9, 2001

(54) ORGANIC POROUS MATERIAL

(75) Inventors: Takashi Hashida; Masaaki Suzuki, both of Osaka; Yukiyoshi Ono, Hirakata, all of (JP)

(73) Assignee: Matsushita Electric Industrial Co., Ltd., Osaka-Fu (JP)

(*) Notice: Subject to any disclaimer, the term of this patent is extended or adjusted under 35 U.S.C. 154(b) by 0 days.

(21) Appl. No.: 09/420,730

(22) Filed: Oct. 20, 1999

(30) Foreign Application Priority Data

Oct. 20, 1998 (JP) .................................................. 10-298891

(51) Int. Cl.[7] ...................................................... C08J 9/224
(52) U.S. Cl. .............................. 521/82; 521/86; 521/88; 521/94; 521/95
(58) Field of Search .................................. 521/142, 154, 521/155, 182, 82, 86, 88, 94, 95

(56) References Cited

U.S. PATENT DOCUMENTS 5,102,597 * 4/1992 Roe et al. .............................. 264/126
5,770,631 * 6/1998 Fukutomi et al. ...................... 521/27
5,973,015 * 10/1999 Coronado et al. ...................... 521/64

FOREIGN PATENT DOCUMENTS 07-138375 A 5/1995 (JP) .

OTHER PUBLICATIONS

K. Yakota et al. "Chemical industry symposium series" "Drying of Silica Alcogel with supercritica Fluid," vol. 35, pp. 149–154 (1993) (English language Abstract included).

* cited by examiner

Primary Examiner—James J. Seidleck
Assistant Examiner—M D Bagwell
(74) Attorney, Agent, or Firm—Akin, Gump, Strauss, Hauer & Feld, L.L.P.

(57) ABSTRACT

The present invention provides an organic porous material having equivalent thermal insulating properties to those of a porous material of a silica material and improved brittleness. The organic porous material of the present invention is an aggregate of organogel fine particles having a particle diameter of 10 to 300 nm, wherein inter-particle crosslinking is formed between adjoining organogel fine particles.

9 Claims, 2 Drawing Sheets

ORGANIC POROUS MATERIAL

BACKGROUND OF THE INVENTION

The present invention relates to an organic porous material used for, for example, thermal insulators, and a method of manufacturing the same.

Foamed materials of organic polymers, such as polyurethane, have conventionally been used as porous materials for thermal insulators of, for example, refrigerators. The organic polymers have excellent flexibility but insufficient thermal insulating properties. Inorganic porous materials, especially those of silica material having excellent thermal insulating properties, have thus been produced and used for the thermal insulators.

The porous material of the silica material is obtained by drying a wet gel under supercritical condition and has pores of approximately 50 nm in diameter. The shorter void distance defined by the pores than a mean free path of oxygen and nitrogen depresses heat conduction of the gas and accordingly ensures the better thermal insulating properties than urethane foam even at atmospheric pressure.

The silica, which constitutes the aerogel, however, has disadvantages such as brittleness, difficulty in handling and the like.

Then, the object of the present invention is thus to provide an organic porous material having equivalent thermal insulating properties to those of a porous material of silica material and improved brittleness.

BRIEF SUMMARY OF THE INVENTION

In order to attain at least part of the above and the other related objects, the present invention is directed to an organic porous material comprising aggregated organogel fine particles having a particle diameter of 10 to 300 nm, in which aggregated particles have inter-particle crosslinkings therebetween. In other words, inter-particle crosslinking is formed between adjoining organogel fine particles.

It is preferable that each pore has a diameter of 5 to 100 nm.

It is further preferable that the organogel fine particles have a density of 0.05 to 0.3 g/cm$^3$.

In the present invention, the organogel fine particle preferably has an intra-particle crosslinking whose molecular bonding structure is different from that of the inter-particle crosslinking.

In the above arrangement, it is preferable that the organogel fine particles comprises a vinyl polymer, and the inter-particle crosslinking is any one of urethane bond, amide bond, oxazolidone bond, siloxane bond, ester bond, and acetal bond.

The present invention is also directed to a method of producing an organic porous material comprising the steps of:

(a) swelling organogel fine particles having a crosslinkable functional group on surface thereof with a solvent;

(b) making the crosslinkable functional group on the surface of the fine particles to react in the solvent to form inter-particle crosslinking between adjoining organogel fine particles, thereby giving an aggregate of the organogel fine particles; and (c) drying the aggregate to remove the solvent.

In accordance with one preferable application of the present invention, the method further includes the step of mixing a crosslinking agent after the step (a) and before the reaction of the crosslinking functional group in the solvent in the step (b).

In accordance with another preferable application of the present invention, the method further includes the step of mixing a crosslinking catalyst after the step (a) and before reacting the crosslinking functional group in the solvent in the step (b).

It is preferable that the aggregate is dried in the step (c) by a supercritical drying method.

The present invention is further directed to a method of manufacturing an organic porous material comprising the steps of:

(i) swelling organogel fine particles having a crosslinking functional group on surface thereof with a solvent;

(ii) drying the swelled organogel fine particles by a supercritical drying method; and (iii) making the crosslinking functional group of the organogel fine particles react to form inter-particle crosslinking between adjoining organogel fine particles, thereby giving an aggregate of the organogel fine particles.

In accordance with one preferable application of the present invention, the method further includes the step of mixing a crosslinking agent after the step (ii) and before the reaction of the crosslinking functional group in the step (iii).

In accordance with another preferable application of the present invention, the method further includes the step of mixing a crosslinking catalyst after the step (ii) and before the reaction of the crosslinking functional group in the step (iii).

These and other objects, features, aspects, and advantages of the present invention will become more apparent from the following detailed description of the present invention with the accompanying drawings.

DETAILED DESCRIPTION OF THE INVENTION

Figure 1:
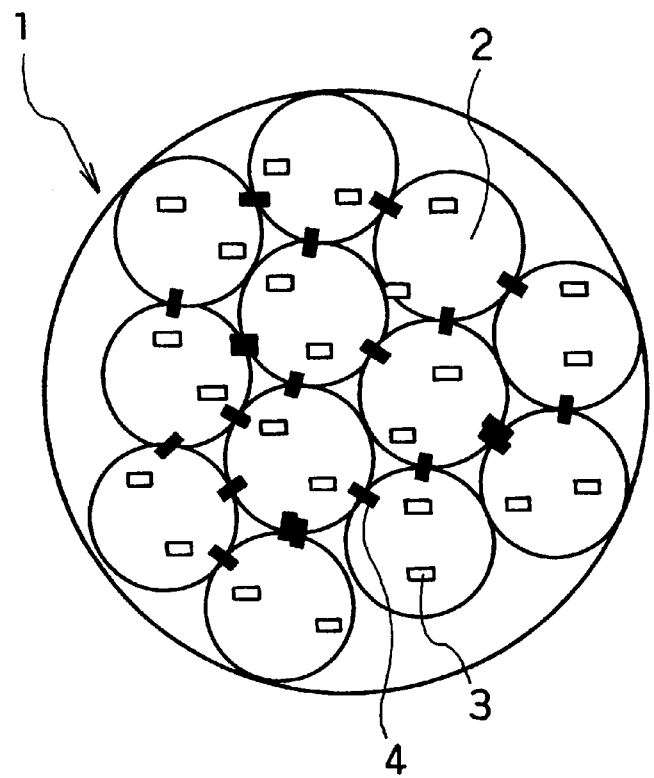
FIG. 1 schematically illustrates the structure of an organic porous material 1 of the present invention.
Figure 2:
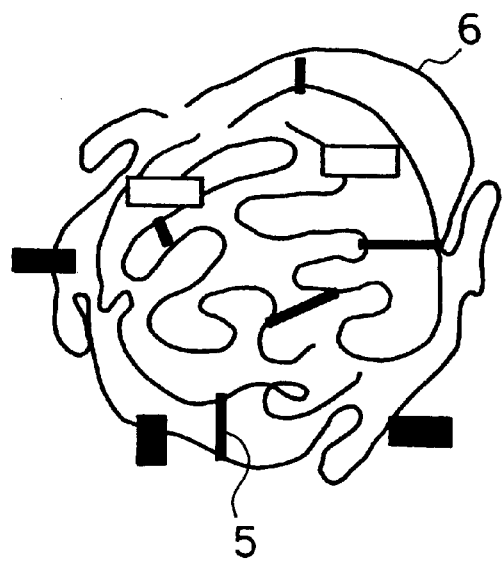
FIG. 2 schematically illustrates the structure of each of the organogel fine particles 2 shown in FIG. 1.
Figure 3:
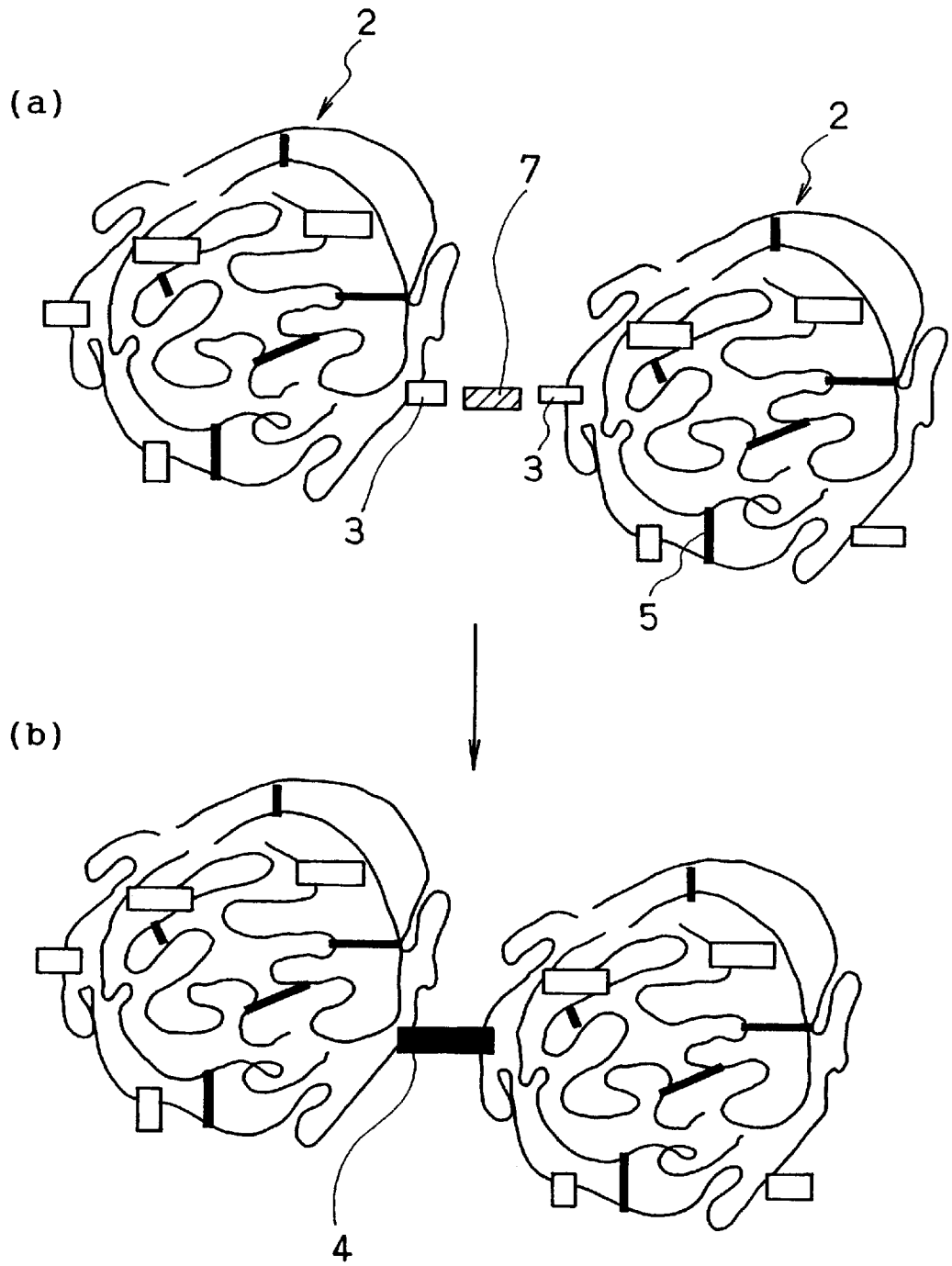
FIG. 3 schematically illustrates a process of crosslinking the organogel fine particles 2 with a crosslinking agent.

The organic porous material of the present invention is described with referring to FIGS. 1 through 3. FIG. 1 schematically illustrates the structure of an organic porous material 1 of the present invention. The organic porous material 1 includes organogel fine particles 2 having crosslinking functional groups 3 and inter-particle crosslinking 4. FIG. 2 schematically illustrates the structure of an organogel fine particle 2 shown in FIG. 1. The organogel fine particle 2 includes polymer chains 6 having intra-particle crosslinking 5.

Referring to FIG. 1, the organic porous material 1 of the present invention is a dense aggregate of the organogel fine particles 2, wherein each organogel fine particle 2 is crosslinked with adjoining organogel fine particles 2 via crosslinking functional groups 3 to form the inter-particle crosslinking 4.

The organogel fine particles 2 form a dry gel, in which the polymer chains 6 have the intra-particle crosslinking 5. The organic porous material 1 of the present invention, which is an aggregate of the organogel fine particles 2, has pores. Since the organogel fine particles 2 form a dense aggregate, the maximum void distance in the organic porous material 1 is expected to be shorter than 100 nm, which corresponds to a distance between the organogel fine particles 2.

The shorter void distance in the organic porous material 1 of the present invention results in a smaller contribution to the heat conduction of the gas component and thereby attains the better thermal insulating properties. The adjoining organogel fine particles 2 are bonded to one another via the inter-particle crosslinking 4. This reduces the heat conduction of the solid between the organogel fine particles 2 and enables the resulting organic porous material 1 to have the excellent thermal insulating properties.

First, the organogel fine paticle, which constitutes the organic porous material of the present invention, is explained. The organogel fine particle may be obtained by polymerizing a mixture of a polymerizable monomer and a crosslinking monomer. Namely, such organogel fine particle may be obtained by introducing a crosslinking, i.e. intra-particle crosslinking into a polymer, which is formed by the crosslinking monomers, to form a gel structure.

Because of the high availability, it is preferable that the organogel fine particles constituting the organic porous material of the present invention comprises a polymer obtained by polymerizing an acrylic monomer, such as an acrylate or a methacrylate, or a vinyl monomer, such as vinyl chloride, vinyl alcohol, vinyl acetate, or styrene, as the polymerizable monomer. The organogel fine particles may be prepared by the known emulsion polymerization process.

As to Intra-particle Crosslinking

A crosslinking monomer "A" should be used for part of the polymerizable monomer in order to form the intra-particle crosslinking.

Typical examples of the crosslinking monomer "A" include ethylene dimethacrylate, divinylbenzene, alkylene glycol dimethacrylate, N,N'-methylene bis-acrylamide, and divinyl adipate, for example. It is desirable that the crosslinking monomer "A" has a substantially equivalent reactivity to that of the material to be crosslinked. For example, ethylene dimethacrylate is preferably used for crosslinking the acrylate, and divinylbenzene for crosslinking the vinyl compound.

Further, the crosslinking monomer "A" may include an oligomer such as oligoester acrylate. Such oligomer is preferable to control the formation of the intra-particle crosslinking.

It is preferable that the intra-particle crosslinking between polymer chains in the organogel fine particle and the inter-particle crosslinking formed between the organogel fine particles have different molecular bonding structures, because of the reason discussed below. The organogel fine particles are obtained by polymerizing a polymerizable monomer, which is dispersed with an emulsifying agent in water. At this moment, the intra-particle crosslinking is formed for gelation. If the intra-particle crosslinking is formed by the same reaction as that for the inter-particle crosslinking, as the intra-particle crosslinking proceeds, the crosslinking function groups, which are to be used for the inter-particle crosslinking, are consumed for the intra-particle crosslinking. This accordingly interferes with formation of the inter-particle crosslinking between the organogel fine particles.

The intra-particle crosslinking may be attained by carbon-carbon bond formed by addition polymerization of an unsaturated bond-containing compound, ether bond by polymerization of an epoxy, or ether bond by condensation of the methylol group.

As to Inter-particle Crosslinking

In the organic porous material of the present invention, the polymer is required to have a crosslinking functional group, in order to form the inter-particle crosslinking. A monomer having the crosslinking functional group (hereinafter, referred to as crosslinking monomer "B") is thus used for at least part of the polymerizabole monomer, which is the raw material of the organogel fine particles.

Typical examples of the crosslinking functional group include hydroxyl group, carboxyl group, epoxy group, and alkoxysilyl group. The inter-particle crosslinking may be attained by urethane bond, amide bond, oxazolidone bond, siloxane bond, ester bond, or acetal bond. Especially the urethane bond, the oxazolidone bond, the siloxane bond, and the ether bond formed by two methylol groups are preferable since the reaction proceeds at a relatively high speed even at low temperatures. The bond of the inter-particle crosslinking is determined by appropriately selecting the crosslinking monomer B and a crosslinking agent.

Typical examples of the crosslinking monomer "B" include 2-hydroxyethyl methacrylate, hydroxypropyl methacrylate, 2-methoxyethyl methacrylate, 2-ethoxyethyl methacrylate, 2-methacryloyloxyethyl succinate, 2-methacryloyloxyethyl maleate, 2-methacryloyloxyethyl phthalate, 2-methacryloyloxyethyl hexahydrophthalate, glycidyl methacrylate, vinyltrimethoxysilane, vinyltriethoxysilane, vinyl-tris(β-methoxyethoxy)silane, and allylamine.

Among these available examples, vinyltriethoxysilane, vinyltrimethoxysilane, vinyl-tris(β-methoxyethoxy)silane, and glycidyl methacrylate are preferable from the viewpoint of the rapid progress of the crosslinking reaction.

When the organogel fine particles are obtained by the emulsion polymerization, the crosslinking monomer B may function as an emulsifying agent.

The following gives available combinations of the inter-particle crosslinking and the intra-particle crosslinking.

(1) Inter-particle crosslinking: Urethane bond by the hydroxyl group, which is the crosslinking functional group, and a di-isocyanate as the crosslinking agent;

Intra-particle crosslinking: Addition polymerization of the unsaturated bonding;

Advantages and effects: The crosslinking functional groups are easily introduced into the organogel fine particles, and the crosslinking reaction between the organogel fine particles proceeds at a high speed.

(2) Inter-particle crosslinking: Condensation of an epoxy;

Intra-particle crosslinking: Addition polymerization of the unsaturated bonding;

Advantages and effects: The reaction between the organogel fine particles proceeds at a high speed.

The density of the organogel fine particles of the present invention having the above configuration is preferably in the range of 0.05 to 0.3 g/cm$^3$. The low density of the organogel fine particles lowers the density of a resulting organic porous material and reduces the contribution to the heat conduction of the solid, thereby assuring the high thermal insulating properties. The density of the organogel fine particles greater than 0.3 g/cm$^3$ enhances the contribution to the heat conduction of the solid and undesirably lowers the thermal insulating properties. The density of the organogel fine particles less than 0.05 g/cm$^3$, on the other hand, causes an insufficient strength and leads to the shrinkage. This makes it difficult to dry the organogel fine particles and obtain the organic porous material of the present invention.

In order to provide an organic porous material of the lowest thermal conductivity stably based on the balance of the thermal conductivity with the strength of the organogel fine particles, the most preferable range of the density is 0.1 to 0.2 g/cm$^3$.

The organogel fine particles that constitute the organic porous material of the present invention preferably have the particle diameter in the range of 10 to 300 nm, since the smaller particle diameter causes difficulty in preparation and the greater particle diameter causes a larger void between the organogel fine particles and thereby increases the thermal conductivity. The more preferable range of the particle diameter is 10 to 50 nm, which attains a sufficiently small void while lowering the thermal conductivity.

The diameter of the pores in the organic porous material of the present invention may be in the range of 5 to 100 nm, in order to assure the low thermal conductivity at atmospheric pressure or under a little reduced pressure. The preferable range of the pore diameter is 5 to 30 nm, which lowers the thermal conductivity to a sufficient level as 50% at atmospheric pressure.

The first method of producing the organic porous material of the present invention conprises the steps of:

(a) swelling organogel fine particles having a crosslinking functional group on surface thereof with a solvent;

(b) making the crosslinking functional group on the surface of the fine particles react in the solvent to form inter-particle crosslinking between adjoining organogel fine particles, thereby giving an aggregate of the organogel fine particles; and (c) drying the aggregate to remove the solvent.

The step (a) makes the organogel fine particles having the crosslinking functional groups on the surface thereof swell in a solvent. The solvent used here should not react with the crosslinking functional groups, so as not to consume the crosslinking functional groups on the surface of the organogel fine particles. In order to prevent a loss of the crosslinking agent used for crosslinking the organogel fine particles as discussed later, the solvent should not react with the crosslinking agent.

As the functional groups contained in the crosslinking agent, there are, for example, hydroxyl group, carboxyl group, epoxy group, alkoxysilyl group, amino group, isocyanate group and the like. For example, when the crosslinking agent contains the carboxyl group, epoxy compounds, alcohols, and amines should not be used for the solvent. In another example, when the crosslinking agent contains the isocyanate group, water, alcohols, carboxylic acids, epoxy compounds, and amines should not be used for the solvent.

The amount of the solvent used for swelling the organogel fine particles is not specifically restricted, as long as the organogel fine particles can be soaked completely in the solvent.

The step (b) makes the crosslinking functional groups on the surface of the organogel fine particles react in the solvent to form the inter-particle crosslinking between each organogel fine particle and an adjoining organogel fine particle. This gives an aggregate of the organogel fine particles.

There are two steps (b-1) and (b-2) discussed below to make the crosslinking functional groups on the surface of the fine particles react in the step (b) of the method of the present invention.

The step (b-1) adds a crosslinking agent to form the crosslinking between fine particles. FIG. 3 schematically illustrates a process of crosslinking the organogel fine particles with a crosslinking agent. In this process, the inter-particle crosslinking 4 is formed between the organogel fine particles 2 with a crosslinking agent 7.

The step (b-2) does not use the crosslinking agent 7 but causes the crosslinking functional groups 3 on the surface of the organogel fine particles 2 to directly react with each other to form the inter-particle crosslinking 4.

The step (b-1) using the crosslinking agent is preferable, since a highly active functional group, such as isocyanate group, may be used as the crosslinking agent, irrespective of the conditions of the synthesis of the organogel fine particles. This facilitates formation of the inter-particle crosslinking.

The step (b-1) is described more in detail.

In this process, the crosslinking functional groups 3 on the surface of the organogel fine particles 2 are reacted with the crosslinking agent 7 to form the inter-particle crosslinking 4 as shown in FIG. 3. The crosslinking agent 7 used here is required to react with two crosslinking functional groups 3 and form the bond. The crosslinking agent 7 is thus required to have at least two functional groups that can react with the crosslinking functional groups 3 to form the bond.

In one example, the crosslinking functional group 3 in the organogel fine particles 2 is hydroxyl group and the crosslinking agent 7 is dicarboxylic acid. In this case, the crosslinking agent 7 forms the ester bond with the crosslinking functional groups 3 on both ends thereof to attain the inter-particle crosslinking 4 between the crosslinking functional groups 3.

In the case where the crosslinking functional group included in the organogel fine particles is hydroxyl group, available examples of the crosslinking agent include polyatomic carboxylic acids and carboxylates, such as dicarboxylic acid, polyatomic epoxy compounds, polyatomic isocyanates, polyatomic aldehydes, and the like. These crosslinking agents form the crosslinking with the hydroxyl group included in the organogel fine particles by means of the ester bond, the hydroxyester bond, the urethane bond, and the acetal bond, respectively.

In another example, when the crosslinking functional group is carboxyl group, available examples of the crosslinking agent include polyatomic epoxy compounds, polyatomic isocyanates, polyatomic amines, and the like. These crosslinking agents form the crosslinking with the carboxyl group included in the organogel fine particles by means of the ester bond, the urethane bond, and the amide bond, respectively. In the case where the polyatomic amine is a tertiary amine, a quaternary ammonium is formed for the crosslinking.

In still another example, when the crosslinking functional group is epoxy group, available examples of the crosslinking agent include polyatomic carboxylates, polyatomic epoxy compounds, polyatomic isocyanates, polyatomic amines, and polyatomic phenols like resorcinol and hydroquinone. These crosslinking agents form the crosslinking with the epoxy group included in the organogel fine particles by means of the hydroxyester bond, the ether bond, the oxazolidone bond, the amino-alcohol bond, and the amide bond, respectively.

In another example, when the crosslinking functional group is alkoxysilyl group, available examples of the crosslinking agent include polyatomic isocyanates. In this case, the urethane bond is formed between the crosslinking agent and the alkoxysilyl group.

Among the above combinations of the crosslinking functional group and the crosslinking agent, the combination of the polyatomic isocyanate as the crosslinking agent with either one of the carboxyl group, the hydroxyl group, the epoxy group, and the alkoxysilyl group as the crosslinking functional group and the combination of the polyatomic amine as the crosslinking agent with the epoxy group as the crosslinking functional group are especially preferable because of the high reactivity.

Isocyanates having two or more functional groups, which are generally used as the raw material of the polyurethane resin, are preferably used for the polyatomic isocyanates as the crosslinking agent. Concrete examples of the polyatomic isocyanates include diphenylmethane diisocyanate, tolylene diisocyanate, xylylene diisocyanate, metaxylylene diisocyanate, hexamethylene diisocyanate, lysine diisocyanate, isophorone diisocyanate, trimethylhexamethylene diisocyanate, and diisocyanates of dimer acids. Isocyanate group-remaining polymers obtained through the reaction of these polyatomic isocyanates with an oligomer or a polyol may also be used as the crosslinking agent.

Diphenylmethane diisocyanate and tolylene diisocyanate are especially preferable since they are not expensive and are readily available.

Concrete examples of the polyatomic amines used as the crosslinking agent include diethylenetriamine, triethylenetetramine, tetraethylenepentamine, diethylaminopropylamine, menthenediamene, isophoronediamine, N-aminoethyl piperazine, bis(4-amino-3-methylcyclohexyl)methane, bis(4-aminocyclohexyl)methane, diaminodiphenylmethane, diaminodiphenyl sulfone, m-phenylenediamine, and the like.

For the rapid progress of the reaction, it is preferable to use a catalyst in the process of crosslinking the fine particles in the step (b-1). Available examples of the catalyst include tertiary amines such as monoamines, diamines, triamines, cyclic amines, alcoholamines and etheramines, and organometallic compounds such as organotin compounds, and the like. When the crosslinking agent is the polyatomic amine and the crosslinking functional group is epoxy group, the catalyst is not required since the amine and the epoxy group have sufficiently high reactivity.

The amount of the crosslinking agent used in the step (b-1) is 0.01 to 10 equivalent weights relative to 1 equivalent weight of the crosslinking functional group included in the organogel fine particles, since all the crosslinking functional groups are not present on the surface of the organogel fine particles and the excessive amount of the crosslinking agent interferes with the progress of the reaction. In order to reduce the cost, the preferable range regarding the quantity of the crosslinking agent is 0.01 to 1 equivalent weights.

The amount of the catalyst added is, for example, 0.1 to 5 equivalent to 1 equivalent of the epoxy group as the crosslinking functional group. The preferable range is 0.1 to 1 equivalent, since the greater quantity does not significantly enhance the effect. In the case of the isocyanate group, the quantity of the catalyst is 0.1 to 10% relative to the quantity of the solvent. In order to depress the side reaction, the preferable range is 0.1 to 2%.

Upon condition that the organogel fine particles are completely soaked in a solvent, the swelled organogel fine particles are mixed with the crosslinking agent and the catalyst if required, so as to attain the reaction of the crosslinking functional group on the surface of the fine particles in the solvent. This process gives an aggregate of the organogel fine particles.

The step (b-2) is described more in detail.

The step (b-2) does not use the crosslinking agent, but causes two crosslinking functional groups 3 to be directly bonded to each other between the organogel fine particles.

In this case, the organogel fine particles having the crosslinking functional group like the epoxy group and the alkoxysilyl group on the surface thereof are preferably used, since they are commercially available and assure the progress of the reaction between the organogel fine particles without the crosslinking agent.

Even in this step, it is also preferable to use a catalyst, in order to attain the sufficient crosslinking rate.

In the case where the crosslinking functional group is epoxy group, available examples of the catalyst include tertiary amines, such as benzyldimethylamine, 2-(dimethylaminomethyl)phenol, and 2,4,6-tris(dimethylaminomethyl)phenol, and Lewis acids such as $BF_3$. The ether bond is formed through the polymerization of the epoxy group.

In another example, when the crosslinking functional group is alkoxysilyl group, the catalyst and water required for hydrolysis of the alkoxysilyl group are mixed with the solvent. In this case, the alkoxysilyl is hydrolyzed to silanol group, which form s the siloxane bond between the adjoining organogel fine particles to attain the crosslinking. Available examples of the catalyst in this case include basic catalysts such as ammonia and ammonium hydroxide and acid catalysts such as hydrochloric acid, nitric acid, sulfuric acid, hydrofluoric acid, and organic acids, such as acetic acid.

In order to assure the rapid progress of the reaction, the amount of the catalyst added is in the range of 0.01 to 5%.

Upon condition that the organogel fine particles are completely soaked in a solvent, the swelling organogel fine particles are mixed with the catalyst if required, so as to attain the reaction of the crosslinking functional group on the surface of the fine particles in the solvent. This process gives an aggregate of the organogel fine particles.

The step (c) in the method of the present invention dries the aggregate of organogel fine particles obtained in either the step (b-1) or the step (b-2), so as to remove the solvent. This process gives a dried organic porous material of the present invention.

When the solvent in the fine pores is evaporated for the removal, the decrease in amount of the solvent retreats the gas-liquid interface and causes a shrinking force to be applied to the wall surface of the pores. This force always acts in the presence of the gas-liquid interface, and increases with a decrease in size of the pores. In the porous material having fine pores, the removal of the solvent in the presence of the gas-liquid interface may destroy the pores.

In order to remove the liquid layer, it is accordingly preferable to freeze dry the organogel fine particles or dry the organogel fine particles in a supercritical state where there is no distinction between the liquid phase and the gas phase.

In the event that the solvent is water, the freeze drying method is applicable. Since the freezing point of water is 0° C., the organogel fine particles can be dried relatively easily by the freeze drying method under reduced pressure.

When the solvent is water or a conventional organic solvent, the critical temperature to attain the supercritical state is over 200° C. The organic porous material to be dried may accordingly have thermal damages. One preferable procedure in this case thus replaces the solvent used for swelling the organogel fine particles with carbon dioxide having a low critical temperature, and subsequently removes the remaining liquid carbon dioxide by the supercritical drying method. The critical temperature of carbon dioxide is near the room temperature, which does not cause any thermal damages to the organic porous material. In the case where water is used for swelling, the replacement with liquid carbon dioxide having the low polarity may not be implemented smoothly. In this case, water is first replaced with another solvent having an intermediate polarity, for example, acetone, and further replaced with carbon dioxide.

The second method of producing the organic porous material of the present invention comprises the steps of:

(i) swelling organogel fine particles having a crosslinking functional group on surface thereof with a solvent;
(ii) drying the swelling organogel fine particles by a supercritical drying method; and
(iii) making the crosslinking functional group of the organogel fine particles react to form inter-particle crosslinking between adjoining organogel fine particles, thereby giving an aggregate of the organogel fine particles.

While the first method crosslinks the organogel fine particles in the solvent, the second method performs the crosslinking process after the drying process.

The step (i) causes the organogel fine particles to swell in a solvent, and the step (ii) dries the swelled organogel fine particles by the supercritical drying method discussed above with regard to the first method.

The subsequent step (iii) makes the crosslinking functional groups on the surface the adjoining organogel fine particles react with each other by addition of a catalyst or a temperature increase to form crosslinking between the organogel fine particles. In the same manner as the first method, a crosslinking agent may be added to react with two crosslinking functional groups and form the inter-particle crosslinking.

The primary difference from the first method is that both a crosslinking agent and a catalyst introduced to the reaction system in the course of the crosslinking process are preferably gas, since the crosslinking process is carried out in the absence of the solvent.

The crosslinking agent may be used in the gas form under the conditions of high temperature atmosphere and high vapor pressure. By way of example, a lower diamine, such as ethylenediamine or tetraethylenediamine, may be used for the crosslinking agent. The vapor of the crosslinking agent is introduced to the reaction system at high temperatures to crosslink with the epoxy group or the carboxyl group as the crosslinking functional group.

Using a lower tertiary amine, for example, trimethylamine, triethylamine, methyldiethylamine, or ethyldimethylamine, as the catalyst enables the epoxy groups as the crosslinking functional group to react directly with each other and form the crosslinking. Using hydrogen chloride as the catalyst enables the silanol groups to react directly with each other and form the crosslinking.

This method also gives the organic porous material of the present invention.

The above description specifies the size and the density of the pores included in the organic porous material and the method of manufacturing the organic porous material, on the assumption that the organic porous material is used for thermal insulators. One possible application of the organic porous material of the present invention introduces a variety of noble metals or transition metals in a highly dispersed state in an organic solvent or water by taking advantage of the functional groups of the organogel fine particles as a ligand, in order to provide a variety of functions other than the thermal insulating properties. The crosslinking functional groups described above may be used as the ligand, or alternatively another functional group may be introduced into the organogel fine particles in its manufacturing process. Concrete examples of such functional group include carboxyl group, amino group, cyano group, bipyridyl group, phenanthrolyl group, amide group, and various ether groups.

The present invention is described more concretely with some examples, although the invention is not at all restricted to these examples.

EXAMPLE 1

EXAMPLE 1 manufactured an organic porous material by crosslinking organogel fine particles according to the first method of the present invention. The organogel fine particles were prepared by polymerizing a mixture, which included ethyl acrylate, methyl methacrylate, 2-hydroxyethyl methacrylate (all manufactured by Kanto Chemical Co., Ltd.) and an oligoester acrylate reactive emulsifying agent New Frontier A-229E (manufactured by DAI-ICHI KOGYO SEIYAKU CO., LTD.) at a weight ratio of 60:40:3:3, by emulsion polymerization in conformity with the method described in 'Painting Industries 1987 Vol. 22, No. 9, pp 385–395'. The crosslinking functional group was accordingly hydroxyl group. Diphenylmethane diisocyanate (manufactured by Kanto Chemical Co., Ltd.) was used for the crosslinking agent.

The organogel fine particles were soaked in methyl ethyl ketone (manufactured by Kanto Chemical Co., Ltd.) to swell. The process subsequently added 3 parts by weight of dibutyltin dilaurate (manufactured by Aldrich Corp.) and 10 parts by weight of diphenylmethane diisocyanate per 100 parts by weight of the organogel fine particles to methyl ethyl ketone including the swelled organogel fine particles while stirring. The mixture was stood still after being stirred well.

The mixture was placed in a pressure vessel, and liquid carbon dioxide having a volume ten times the volume of methyl ethyl ketone was introduced at room temperature and 65 atmospheric pressure and mixed with methyl ethyl ketone. Then, a mixture of carbon dioxide of a specific volume that was half the volume of the introduced liquid carbon dioxide and methyl ethyl ketone in the gas form was discharged. The process repeated the introduction of the liquid carbon dioxide and discharge of the mixture of carbon dioxide and methyl ethyl ketone so that methyl ethyl ketone in the aggregate of the organogel fine particles was replaced with the liquid carbon dioxide. The organogel fine particles were then kept in the supercritical state by regulating the temperature to 40° C. and the pressure to 80 atmospheric pressure. Then, by gradually decreasing the pressure, carbon dioxide was removed from the aggregate of organogel fine particles to dry the aggregate.

The resulting organic porous material obtained was observed by electron microscope. The particle diameter of the organogel fine particles was approximately 90 nm and the pore diameter formed between the polymer chains was not greater than 20 nm.

The density of the organogel fine particles was 0.09 $g/cm^3$, which was calculated from the volume of the organogel fine particles the volume of the void between the fine particles, and the weight of the organic porous material.

EXAMPLES 2 AND 3

The solvent used for swelling was n-hexane (manufactured by Kanto Chemical Co., Ltd.) in EXAMPLE 2 and n-butane (manufactured by Kanto Chemical Co., Ltd.) in EXAMPLE 3. These solvents reduced the degree of swelling and thereby enhanced the density of the organogel fine particles constituting the organic porous material. Organic porous materials of the respective examples were manufactured in the same manner as EXAMPLE 1. The observed particle diameter of the organogel fine particles was 55 nm and 46 nm, and the calculated density was 0.34 $g/cm^3$ and 0.47 $g/cm^3$.

The intra-particle crosslinking in EXAMPLES 1 through 3 was carbon-carbon bond formed by addition polymerization of an unsaturated bond-containing compound, while the inter-particle crosslinking was urethane bond formed by the reaction of the hydroxyl group with the isocyanate group.

Comparative Examples 1 and 2

Organogel fine particles of greater diameters were obtained by using large amounts of an emulsion accelerator (copper sulfate) in the process of emulsion polymerization.

Then, by using the organogel fine particles, organic porous materials as the respective COMPARATIVE EXAMPLES 1 and 2 were manufactured in the same manner as EXAMPLE 1 using methyl ethyl ketone as the swelling solvent. The observed particle diameter of the organogel fine particles was 530 nm and 380 nm, and the calculated density was 0.08 g/cm$^3$ and 0.1 g/cm$^3$.

The organic porous materials obtained in EXAMPLES 1 through 3 were pressed with a hand. These organic porous materials were not broken into powder like silica aerogel, but were crushed in the integral state. This is because the organic porous materials of these examples have a flexible bond network. The organic porous material of the present invention accordingly has improved brittleness, while the conventional silica aerogel has a rigid bond structure and is readily broken into pieces.

The thermal conductivity was measured with regard to the organic porous materials of EXAMPLES 1 through 3 and COMPARATIVE EXAMPLES 1 and 2. The thermal conductivity of the organic porous materials of EXAMPLES 1 through 3 was 0.015 kcal/mh° C. (swelling solvent: methyl ethyl ketone), 0.021 kcal/mh° C. (swelling solvent: n-hexane), and 0.023 kcal/mh° C. (swelling solvent: n-butane). The thermal conductivity of the organic porous materials of COMPARATIVE EXAMPLES 1 and 2 having the particle diameter of 530 nm and 380 nm was 0.030 kcal/mh° C. and 0.027 kcal/mh° C.

The desirable thermal conductivity of EXAMPLES 1 through 3 is ascribed to the smaller particle diameter of the organogel fine particles and the dense bond thereof. The shorter void distance between the organogel fine particles reduces the heat conduction of the gas, while the smaller density reduces the heat conduction of the solid. The high thermal conductivity of COMPARATIVE EXAMPLES 1 and 2 is ascribed to the greater particle diameter of the organogel fine particles, which leads to the longer void distance.

EXAMPLE 4

In EXAMPLE 4, an organic porous material was produced by crosslinking organogel fine particles according to the first method of the present invention. The organogel fine particles were prepared by polymerizing a mixture, which included ethyl acrylate, methyl methacrylate, glycidyl methacrylate (manufactured by Kanto Chemical Co., Ltd.) and the oligoester acrylate reactive emulsifying agent New Frontier A-229E (manufactured by DAI-ICHI SEIYAKU KOGYO CO., LTD.) at a weight ratio of 80:20:2:5, by emulsion polymerization. The crosslinking functional group was accordingly epoxy group. Tolylene 2,4-di-isocyanate (manufactured by Kanto Chemical Co., Ltd.) was used for the crosslinking agent. Acetone was used for the swelling solvent. The organic porous material was produced in the same manner as EXAMPLE 1. The intra-particle crosslinking in EXAMPLE 4 was carbon-carbon bond formed by addition polymerization of an unsaturated bond-containing compound, while the inter-particle crosslinking was oxazolidone bond formed by the reaction of the epoxy group with the isocyanate group.

The resulting organic porous material had the thermal conductivity of 0.017 kcal/mh° C., which proves the excellent thermal insulating properties. The particle diameter of the organogel fine particles was 60 nm and the density was 0.21 g/cm$^3$. Like EXAMPLE 1, the organic porous material of EXAMPLE 4 was not broken into pieces under the pressure with a hand, and had improved brittleness compared with the conventional silica aerogel.

EXAMPLE 5

In EXAMPLE 5, an organic porous material was produced by crosslinking organogel fine particles according to the first method of the present invention. The organogel fine particles used here were those prepared in EXAMPLE 4. EXAMPLE 5 did not use any crosslinking agent, but caused the crosslinking functional groups on the surface or the organogel fine particles to directly react and form the bond. Benzyldimethylamine (manufactured by Kanto Chemical Co., Ltd.) was used for the catalyst.

The organogel fine particles were soaked in tetrahydrofuran (manufactured by Kanto Chemical Co., Ltd.) to swell. Then, 3 parts by weight of tetrahydrofuran including the swelled organogel fine particles was mixed with 100 parts by weight of the organogel fine particles while stirring. The mixture was stood still after being well stirred. In the same manner as EXAMPLE 1, the process replaced tetrahydrofuran with carbon dioxide and carried out the supercritical drying process, so as to obtain an organic porous material. The intra-particle crosslinking in EXAMPLE 5 was carbon-carbon bond formed by addition polymerization of an unsaturated bond-containing compound, while the inter-particle crosslinking was ether bond by polymerization of the epoxy group.

The particle diameter of the organogel fine particles was 70 nm and the density was 0.13 g/cm$^3$. The organic porous material of EXAMPLE 5 had the excellent thermal insulating properties substantially equivalent to those of EXAMPLE 1. Like EXAMPLE 1, the organic porous material of EXAMPLE 5 was not broken into pieces under the pressure with a hand, and had improved brittleness compared with the conventional silica aerogel.

EXAMPLE 6

In EXAMPLE 6, an organic porous material was produced by crosslinking organogel fine particles according to the second method of the present invention. The organogel fine particles were prepared by polymerizing a mixture, which included ethyl acrylate, methyl methacrylate, glycidyl methacrylate and the oligoester acrylate reactive emulsifying agent New Frontier A-229E (manufactured by DAI-ICHI SEIYAKU KOGYO CO., LTD.) at a weight ratio of 80:20:5:5, by emulsion polymerization. EXAMPLE 6 did not use any crosslinking agent, but caused the crosslinking functional groups on the surface or the organogel fine particles to directly react and form the bond. Trimethylamine (manufactured by Kanto Chemical Co., Ltd.) was used for the catalyst.

The organogel fine particles thus obtained were soaked in acetone to swell. In the same manner as EXAMPLE 3,the process replaced acetone with carbon dioxide and carried out the supercritical drying process.

The dried organogel fine particles were placed in a vessel, which was filled with the vapor of trimethylamine. The process subsequently removed trimethylamine to obtain an organic porous material. The intra-particle crosslinking in EXAMPLE 6 was carbon-carbon bond formed by addition polymerization of an unsaturated bond-containing compound, while the inter-particle crosslinking was ether bonding by polymerization of the epoxy group.

The particle diameter of the organogel fine particles was 70 nm and the density was 0.17 g/cm$^3$. The resulting organic porous material had the thermal conductivity of 0.0155 kcal/mh° C., which proves the excellent thermal insulating properties.

The organic porous material of the present invention includes the crosslinked organogel fine particles of not greater than 300 nm in size. The dense aggregate of the fine particles makes small voids between the particles, thereby depressing the heat conduction of the gas and attaining the excellent thermal insulating properties. Compared with the silica aerogel, the organic porous material of the present invention composed of crosslinked organic particles has improved brittleness.

The method of the present invention causes the organogel fine particles to swell in a solvent and to be crosslinked by taking advantage of the reaction of the functional group on the surface of the fine particles. The method then removes the solvent used for the swelling, so as to obtain a dried porous material. The swelling process gives a low density body, and the crosslinking and drying process facilitates formation of a greater porous material.

The method of the present invention may remove the solvent used for the swelling by the supercritical drying method, thereby preventing the shrinkage of the porous material and giving an organic porous material of the low density.

The present invention is not restricted to the above embodiments/examples or their modifications, but there may be many other modifications, changes, and alterations without departing from the scope or spirit of the main characteristics of the present invention.

The scope and spirit of the present invention are limited only by the terms of the appended claims.

What is claimed is:

1. An organic porous material comprising aggregated organogel fine particles having a particle diameter of 10 to 300 nm and a density of 0.05 to 0.3 g/cm$^3$, wherein inter-particle crosslinking is formed between adjoining organogel fine particles.

2. An organic porous material in accordance with claim 1, wherein each pore has a diameter of 5 to 100 nm.

3. An organic porous material in accordance with claim 1, said organogel fine particles have an intra-particle crosslinking whose molecular bond structure is different from that of said inter-particle crosslinking.

4. An organic porous material in accordance with claim 3, wherein said organogel fine particles comprise a vinyl polymer, and said inter-particle crosslinking is urethane bond, amide bond, oxazolidone bond, siloxane bond, ester bond or acetal bond.

5. A method of manufacturing an organic porous material comprising aggregated organogel fine particles having a particle diameter of 10 to 300 nm and a density of 0.05 to 0.3 g/cm$^3$, inter-particle crosslinking formed between adjoining organogel fine particles, said method comprising the steps of:

(a) swelling organogel fine particles having a crosslinking functional group on a surface thereof with a solvent;

(b) making said crosslinking functional group on the surface of the fine particles react in the solvent to form inter-particle crosslinking between adjoining organogel fine particles, thereby giving an aggregate of the organogel fine particles; and (c) drying said aggregate to remove said solvent.

6. A method in accordance with claim 5, further comprising the step of mixing a crosslinking agent after said step (a) and before the reaction of said crosslinking functional group in the solvent in said step (b).

7. A method in accordance with claim 5, further comprising the step of mixing a crosslinking catalyst after said step (a) and before the reaction of said crosslinking functional group in said solvent in said step (b).

8. A method in accordance with claim 5, wherein said aggregate is dried in said step (c) by a supercritical drying method.

9. A method of manufacturing an organic porous material comprising aggregated organogel fine particles having a particle diameter of 10 to 300 nm and a density of 0.05 to 0.3 g/cm$^3$, wherein inter-particle crosslinking is formed between adjoining organogel fine particles, said method comprising the steps of:

(i) swelling organogel fine particles having a crosslinking functional group on a surface thereof with a solvent;

(ii) drying the swelled organogel fine particles by a supercritical drying method;

(iii) mixing a crosslinking agent or a crosslinking catalyst with the dried particles; and (iv) making the crosslinking functional group of the organogel fine particles react with the crosslinking agent or the crosslinking catalyst to form inter-particle crosslinking between adjoining organogel fine particles, thereby giving an aggregate of the organogel fine particles.

* * * * *